US009963258B2

(12) United States Patent
Rapp et al.

(10) Patent No.: US 9,963,258 B2
(45) Date of Patent: May 8, 2018

(54) PACKAGING ASSEMBLY, IN PARTICULAR CARTONING ASSEMBLY

(71) Applicant: Robert Bosch GmbH, Stuttgart (DE)

(72) Inventors: Reinhard Rapp, Stuttgart (DE); Ruediger Grabowski, Waiblingen (DE); Josef Weis, Nussloch (DE)

(73) Assignee: Robert Bosch GmbH, Stuttgart (DE)

( * ) Notice: Subject to any disclaimer, the term of this patent is extended or adjusted under 35 U.S.C. 154(b) by 676 days.

(21) Appl. No.: 14/408,034

(22) PCT Filed: Apr. 18, 2013

(86) PCT No.: PCT/EP2013/058044
§ 371 (c)(1),
(2) Date: Dec. 15, 2014

(87) PCT Pub. No.: WO2013/185954
PCT Pub. Date: Dec. 19, 2013

(65) Prior Publication Data
US 2015/0143777 A1    May 28, 2015

(30) Foreign Application Priority Data

Jun. 14, 2012 (DE) .................. 10 2012 209 987

(51) Int. Cl.
*B31B 50/06* (2017.01)
*B31B 50/78* (2017.01)
(Continued)

(52) U.S. Cl.
CPC ............ *B65B 43/126* (2013.01); *B65B 7/20* (2013.01); *B65B 35/405* (2013.01);
(Continued)

(58) Field of Classification Search
CPC .................. B31B 2201/282; B65B 43/265
(Continued)

(56) References Cited

U.S. PATENT DOCUMENTS 2,136,897 A * 11/1938 Thayer .................... B41F 17/26
101/37
2,293,498 A * 8/1942 First ........................ B65B 51/18
101/351.8

(Continued)

FOREIGN PATENT DOCUMENTS

DE          10128185          12/2002
EP          0705684           4/1996
(Continued)

OTHER PUBLICATIONS

International Search Report for Application No. PCT/EP2013/058044 dated Jul. 4, 2013 (English Translation, 2 pages).
(Continued)

*Primary Examiner* — Thanh Truong
*Assistant Examiner* — Patrick Fry
(74) *Attorney, Agent, or Firm* — Michael Best & Friedrich LLP

(57) ABSTRACT

The invention relates to a packaging assembly comprising a device for transporting a packaging means (2), in particular a carton, said device comprising a continuous conveying section (3) and a plurality of conveying elements (4, 5). The continuous conveying section (3) is oriented vertically, forming an upper run region (30) and a lower rm region (31), and the packaging means (2) is transported on the lower run region (31).

9 Claims, 2 Drawing Sheets

(51) Int. Cl.

| | | |
|---|---|---|
| *B65B 7/20* | (2006.01) | |
| *B65B 35/20* | (2006.01) | |
| *B65B 35/40* | (2006.01) | |
| *B65B 43/12* | (2006.01) | |
| *B65B 43/18* | (2006.01) | |
| *B65B 43/26* | (2006.01) | |
| *B65B 43/32* | (2006.01) | |
| *B65B 43/39* | (2006.01) | |
| *B65B 43/44* | (2006.01) | |
| *B65B 43/46* | (2006.01) | |
| *B65B 43/52* | (2006.01) | |
| *B65B 59/00* | (2006.01) | |
| *B65B 61/26* | (2006.01) | |
| *B65B 65/00* | (2006.01) | |
| *B65C 1/02* | (2006.01) | |
| *B65G 17/20* | (2006.01) | |
| *B65G 59/02* | (2006.01) | |
| *B65G 59/04* | (2006.01) | |

(52) U.S. Cl.
CPC .......... *B65B 43/185* (2013.01); *B65B 43/265* (2013.01); *B65B 43/325* (2013.01); *B65B 43/39* (2013.01); *B65B 43/44* (2013.01); *B65B 43/46* (2013.01); *B65B 43/52* (2013.01); *B65B 59/005* (2013.01); *B65B 61/26* (2013.01); *B65B 65/003* (2013.01); *B65C 1/02* (2013.01); *B65G 17/20* (2013.01); *B65G 59/02* (2013.01); *B65G 59/04* (2013.01); *B31B 50/062* (2017.08); *B31B 50/782* (2017.08); *B65B 35/205* (2013.01)

(58) Field of Classification Search
USPC .......................... 53/458, 564, 566; 198/726
See application file for complete search history.

(56) References Cited

U.S. PATENT DOCUMENTS

| | | | | |
|---|---|---|---|---|
| 3,060,654 | A | | 10/1962 | Lubersky et al. |
| 3,732,966 | A | * | 5/1973 | Treiber ............... B65B 35/20 156/360 |
| 3,783,752 | A | * | 1/1974 | Langen ............... B31B 1/00 493/18 |
| 3,906,705 | A | * | 9/1975 | Beck .................. B65B 35/205 53/252 |
| 4,012,887 | A | * | 3/1977 | Calvert ............... B65B 43/265 53/251 |
| RE30,921 | E | * | 5/1982 | McDowell ............ B65B 43/185 271/132 |
| 4,390,390 | A | * | 6/1983 | Margraf ............... B65C 9/36 156/566 |
| 4,415,048 | A | * | 11/1983 | Teraoka ............... B65C 1/02 177/245 |
| 4,578,927 | A | * | 4/1986 | Scarpa ................ B65B 35/205 53/252 |
| 4,610,125 | A | * | 9/1986 | Meives ................ B65B 11/58 53/207 |
| 4,736,569 | A | * | 4/1988 | Hudson ............... B65B 7/20 53/377.2 |
| 4,787,881 | A | * | 11/1988 | Andersson ........... B65B 43/265 493/313 |
| 5,027,586 | A | * | 7/1991 | Ramaker ............. B65B 43/285 493/316 |
| 5,061,231 | A | * | 10/1991 | Dietrich .............. B65B 43/265 271/95 |
| 5,185,984 | A | * | 2/1993 | Tisma ................. B65B 35/205 53/252 |
| 5,298,008 | A | * | 3/1994 | Decker ............... B31B 5/80 414/797 |
| 5,509,257 | A | * | 4/1996 | Tagliaferri .......... B65B 35/205 53/252 |
| 5,562,581 | A | * | 10/1996 | Roberto ............. B65B 43/305 493/310 |
| 5,613,828 | A | * | 3/1997 | Haddow ............. B65B 43/305 414/798.9 |
| 5,671,587 | A | | 9/1997 | Robinson |
| 5,692,361 | A | * | 12/1997 | Ziegler ............... B65B 5/106 53/157 |
| 5,809,746 | A | * | 9/1998 | DePuy ............... B65B 43/265 198/728 |
| 6,629,403 | B1 | * | 10/2003 | Tisma ................. B65B 43/60 198/867.05 |
| 6,698,163 | B2 | * | 3/2004 | Greenwell ........... B65B 25/141 53/429 |
| 6,872,176 | B2 | * | 3/2005 | Wyss .................. B65B 43/285 493/123 |
| 7,310,925 | B2 | * | 12/2007 | Monti ................. B65B 5/024 493/309 |
| 8,707,663 | B2 | * | 4/2014 | Matheyka ........... B65B 43/465 141/166 |
| 2009/0025343 | A1 | | 1/2009 | Salm |
| 2009/0158694 | A1 | * | 6/2009 | Matheyka ........... B65B 43/465 53/468 |

FOREIGN PATENT DOCUMENTS

| | | |
|---|---|---|
| EP | 0881182 | 12/1998 |
| JP | S62102523 A | 5/1987 |
| JP | H11503693 A | 3/1999 |
| JP | 2005132435 A | 5/2005 |
| WO | 03047977 | 6/2003 |

OTHER PUBLICATIONS

Beckhoff Automation GMBH & Co. KG, "XTS. The Linear Transport System from Beckhoff," YouTube, Jun. 6, 2012, retrieved from the internet Feb. 26, 2015, https://www.youtube.com/watch?v=GQsnjFTG26U (3 pages).

Beckhoff Automation GMBH & Co. KG, "Hannover Messe 2012, Day 1: Beckhoff Trade Show TV," YouTube, Apr. 24, 2012, retrieved from the internet Feb. 26, 2015, https://www.youtube.com/watch?v=85WFTcww-qW (2 pages).

Beckhoff Automation GMBH & Co. KG, "Hannover Messe 2012, Day 2: Beckhoff Trade Show TV," YouTube, Apr. 24, 2012, retrieved from the internet Feb. 26, 2015, https://www.youtube.com/watch?v=pVVRCUCcd6A (1 pages).

Beckhoff Automation Canada, "Hannover Messe 2012, Beckhoff Automation XTS conveyor concept," video, Jun. 5, 2012, retrieved from the internet Feb. 26, 2015, https://www.dpncanada.com/Video-Library/Trade-Shows-Conferences/Hannover-Messe-2012-Beckhoff-Automation-XTS-conveyor-concept.html (1 pages).

Beckhoff, "Drive Technology—Rethought, XTS.eXtended Transport System," brochure, pp. 1-32 (2012).

\* cited by examiner

PACKAGING ASSEMBLY, IN PARTICULAR CARTONING ASSEMBLY

BACKGROUND OF THE INVENTION

The present invention relates to a packaging arrangement, and in particular a cartoning arrangement which permits in particular suspended transportation of packaging means in the case of a circulatory conveying route.

The field of packaging technology includes packaging by means of cardboard cartons, which, on account of the packaging material, has to meet specific requirements. It is frequently the case here that a plurality of articles are packed together in a carton and made ready for shipping. It is usually the case here that an open carton is packed from above, as is known for example from EP 1 530 541 B1. This known cartoning machine, however, has the disadvantage that, in the case of format adjustments, for example changeover to larger or smaller cartons, it is also necessary for the corresponding retaining means for the cartons to be changed over or adjusted, for example, mechanically, which leads to long changeover and stoppage periods for the cartoning machines. In addition, it is a perennial problem with known cartoning machines that various handling steps, e.g. the operations of opening up a collapsed carton blank, of loading the opened-up carton, and of closing the loaded carton, etc., require different cycle times, and therefore the machine output which can be achieved is determined by the longest-lasting operation. During operation, however, this often results in undesired fluctuations in speeds in modules with relatively short operating times and/or in undesired stoppages and synchronization problems.

SUMMARY OF THE INVENTION

The packaging arrangement according to the invention has the advantage, by contrast, that the packaging means, in particular folding boxes composed of cardboard, can be transported on a lower strand region of a vertically arranged circulatory conveying route. According to the invention, therefore, suspended transportation of the packaging means is thus implemented. This has the further advantage that a region below the vertically arranged conveying route its free and can be utilized for example for the arrangement of a wide variety of handling modules. This yields, according to the invention, numerous degrees of freedom which are highly expedient in particular in the case of cardboard cartons being used as packaging means, because in the case of carton-type packaging means, numerous handling steps are required (for example opening up the carton which is normally supplied in collapsed form, holding open carton flaps, filling the carton, closing the carton, printing/labelling the carton, etc.). Furthermore, this leads to a very compact packaging arrangement with only a small space requirement.

It is preferable for a multiplicity of conveying elements to be arranged on the circulatory conveying route, which conveying elements can each be driven individually and independently of one another. In this way, a transportation device can be provided with which, through individual control of individual conveying elements, individual conveying tasks can be realized. In particular, it is possible in this way to realize compensation of fluctuations in the product flow or any desired defined spacings between individual conveying elements. Furthermore, it is possible to realize simplified synchronization of the products with a discharge speed and careful transportation. Furthermore, new formats, for example different package sizes and/or different package shapes, can be adapted to directly by means of the individually driveable conveying elements, without changeover time. The individual conveying elements are preferably driven by means of a linear drive. In an alternative embodiment, suspended conveyance of the articles may however also be realized using a conventional transportation system (for example chain, toothed belt or the like), with the known disadvantages with regard to flexibility.

It is particularly preferable for in each case a first and a second conveying element to form a common conveying device which conveys only an individual packaging means. Thus, two individual conveying elements are combined to form a common conveying device and jointly convey the packaging means along the conveying route.

Particularly preferably, the first conveying element comprises here an erecting device for erecting a collapsed packaging means, in particular a collapsed carton. Further preferably, the second conveying element is a retaining device for retaining the packaging means. The retaining device is particularly preferably a gripper or a suction element or the like. The erecting device is preferably a pivotable lever, wherein the collapsed packing means is erected by the pivoting movement of the lever.

According to a further preferred configuration of the present invention, the packaging arrangement according to the invention also comprises a packaging-means module with a packaging-means store with a multiplicity of collapsed packaging means. Here, the packaging-means store is arranged beneath the circulatory conveying route. It is thus possible for the conveying element to pick up a packaging means as it passes the packaging-means store, and for said packaging means to then be erected (opened up) and transported via the conveying route.

Further preferably, the first and/or second conveying element, which together form the common conveying device, has a flap-opening device which brings flaps on the packaging means into an open position and holds them open. It is ensured in this way that, during a subsequent loading process, none of the flaps of the packaging means impede the loading process, and the packaging means is fully open.

In a further preferred configuration of the invention, the packaging arrangement also comprises a loading module for inserting articles into the packaging means while the packaging means are still located on the lower-strand region of the circulatory conveying route. In this way, a loading module is additionally integrated into the packaging arrangement according to the invention, wherein the loading module is preferably arranged laterally on the packaging means and the packaging means is also laterally open. In this way, a pushing-in process can be performed, for example by means of at least one pushing-in element, in a horizontal direction in order to push articles laterally into the open packaging means. It is also preferable for the loading module to further comprise a closed, in particular oval circulatory path, on which a multiplicity of pushing-in elements circulate. It is preferable here for each pushing-in element to be driveable individually and independently of other pushing-in elements. This also makes it possible to realize an independent pushing-in movement by way of individual pushing-in elements. As a result of using the circulatory path on the loading module, the operating route and the return route are not the same and, for example, the pushing-in elements can be moved on the respective routes by way of flexible movement profiles. It is also the case that this flexible loading module achieves the situation where format alterations or format changeovers do not have any effect on the loading module, which can be adapted in flexible fashion to such format alterations simply by virtue of the movement sequence being altered. For the return operation, it is also possible for the pushing-in elements to be guided in a drive-free manner in some places or to be moved by being carried along mechanically or by travelling in an accumulated state or the like or using available kinetic energy. The pushing-in elements are preferably driven by means of a linear drive.

Further preferably, the packaging arrangement according to the invention also comprises a closure module for closing the filled packaging means. The closure module preferably comprises devices for closing flaps of the packaging means and subsequently fixing said flaps for example by means of hot-setting adhesive.

A weighing module for weighing empty and/or loaded packaging means is preferably provided.

Further preferably, the packaging arrangement according to the invention comprises an identifying module for providing the packaging means with identification. The identifying module may for example comprise a printing device, which prints an identification directly onto the packaging means, or alternatively a label-sticking unit, which sticks labels or the like onto the packaging means.

According to a further preferred configuration of the present invention, the articles which are to be transported are packaging means, in particular cartons. It is particularly preferable here for the apparatus to be a cartoning apparatus in which a collapsed carton is accommodated and erected (opened up), subsequently loaded and then closed and, if appropriate, also provided with identification, wherein all the operations are carried out preferably on the lower-strand region of the circulating conveying route. Transfer to a further transporting system can then take place.

BRIEF DESCRIPTION OF THE DRAWINGS

Preferred exemplary embodiments of the invention will be described in detail hereinbelow with reference to the accompanying drawing, in which.

DETAILED DESCRIPTION

A packaging arrangement 1 according to a first preferred exemplary embodiment of the invention will be described in detail hereinbelow with reference to FIG. 1.

Figure 1:
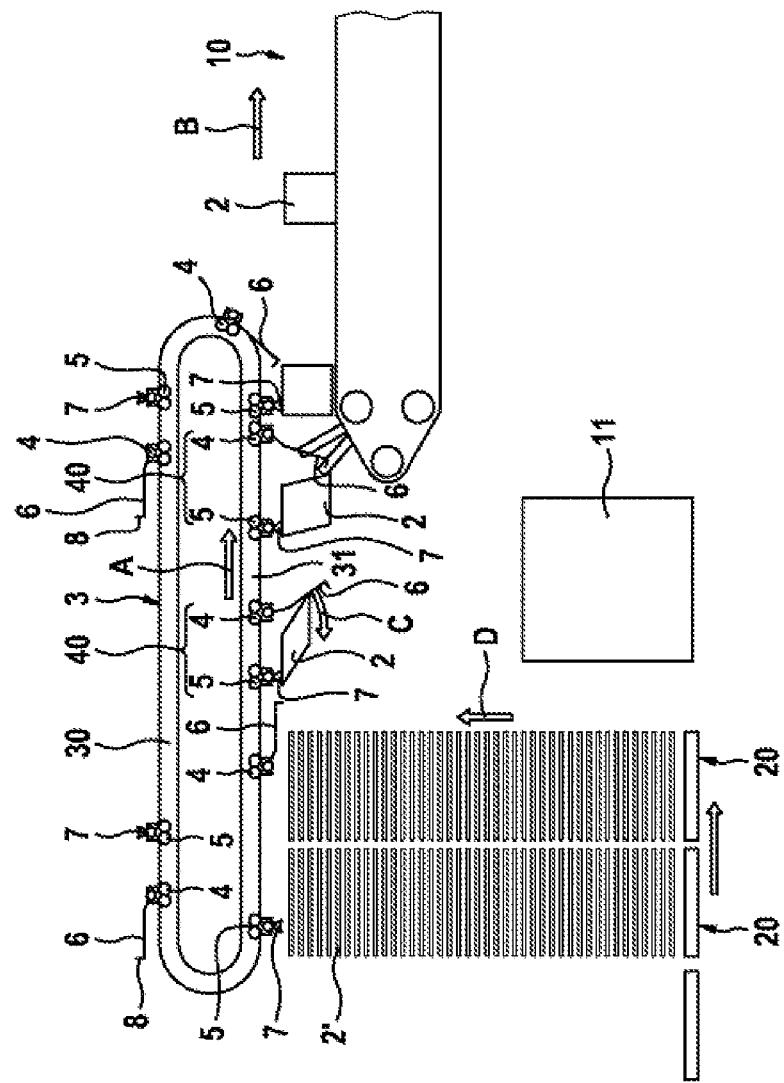
FIG. 1 shows a schematic side view of a packaging arrangement according to a first exemplary embodiment of the invention.

As can be seen from FIG. 1, the packaging arrangement 1 for transporting a packaging means 2 comprises a circulating conveying route 3, which is arranged in oval form. The circulating conveying route 3 here is arranged in the vertical direction, and therefore an upper-strand region 30 and a lower-strand region 31 are present. The packaging means 2 are conveyed in suspended fashion on the lower-strand region 31.

A multiplicity of conveying elements are arranged on the circulating conveying route, reference sign 4 designating a first conveying element and reference sign 5 designating a second conveying element. The two conveying elements 4, 5 have different handling devices, wherein the first conveying element 4 has an erecting device 6 and the second conveying element 5 has a retaining device 7. The erecting device 6 of the first conveying element is a pivotable lever, of which the free end is bent over in hook form and forms a flap-opening device 8. The retaining device 7 of this exemplary embodiment is a sucker, although, as an alternative, it may also be, for example, a gripper or the like.

As indicated in FIG. 1 by the curly brackets, a first conveying element 4 and a second conveying element 5 here form a common conveying device 40. The two conveying elements 4, 5 of the conveying device 40 interact when the packaging means 2 is being removed and opened up. It is nevertheless possible here for each individual conveying element of each conveying device 40 to be activated and moved individually and independently of the other conveying elements, preferably by means of a linear drive.

As can also be seen from FIG. 1, the packaging means 2 are arranged in a plurality of packaging-means stores 20, wherein reference sign 2' denotes packaging means collapsed in each case in the packaging-means stores. Since the circulating conveying route 3 is arranged vertically, the packaging-means store 20 may be arranged beneath the conveying route 3. It is thus possible for the two interacting first and second conveying elements 4, 5, which form the common conveying device 40, to remove in each case the uppermost collapsed packaging means 2' from the stack. As indicated in FIG. 1, a plurality of packaging-means stacks may be provided beneath the conveying route 3, wherein in particular flexible changeover of removal positions of the collapsed packaging means 2' between the individual stacks is possible. Since the collapsed packaging means 2' are removed from the top, the size of the residual stack in the packaging-means store is immaterial, and this therefore means that reliable processing is always possible since the packaging-means stacks are readjusted in height (arrow D) in each case following a removal operation. In addition, it is also possible for the packaging-means stores to be pre-filled with packaging means outside the packaging arrangement and to be exchanged for empty magazines, without the installation being stopped, while a production process is underway.

Furthermore, the use of two individually driveable and displaceable first and second conveying elements 4, 5 makes it possible for each packaging means to be removed from the packaging-means store 20, and erected, irrespective of format. This is because the invention makes it possible for a spacing in the running direction between the first and second conveying elements to be predetermined individually in respect of the respective pack size by a control unit, and it is therefore readily possible for packing means of a wide variety of different sizes to be processed. There are no format restrictions here, for example as a result of holder or mounts for the packs or the like. The spacing between the first and second conveying elements 4, 5 can be adjusted individually in each case. It is also possible to use the packaging arrangement according to the invention for processing packaging means of different sizes for example alternately.

In the case of the exemplary embodiment shown in FIG. 1, then, first of all a collapsed packaging means 2' is removed from the packaging-means store 20 by the common conveying device 40, formed by the first and second conveying elements 4, 5. Thereafter, the collapsed packaging means is erected by virtue of the erecting device 6 being pivoted in the direction of the arrow C, wherein the first and second conveying elements are moved along the circulating conveying route 3 in the direction of the arrow A. The pivoting direction of the erecting device 6 here is counter to the conveying direction on the conveying route. For the purpose of erecting the collapsed packaging means 2', it is possible here for the two conveying elements 4, 5 to be moved at the same speed or, as an alternative, for one of the conveying elements 4, 5 to be moved more quickly than the other one of the conveying elements, this giving rise to the packaging means being erected. During the entire handling process, no transfer of the packaging means takes place, which is a great advantage of this solution variant (interface dispensed with). The erected packaging means 2 is then transferred to a transporting system 10, via which onward transportation takes place in the direction of the arrow B.

Furthermore, reference sign 11 denotes a rejects container, in which defective packaging means can be separated out. The arrangement of a plurality of rejects containers (e.g. after each process step) is conceivable.

Figure 2:
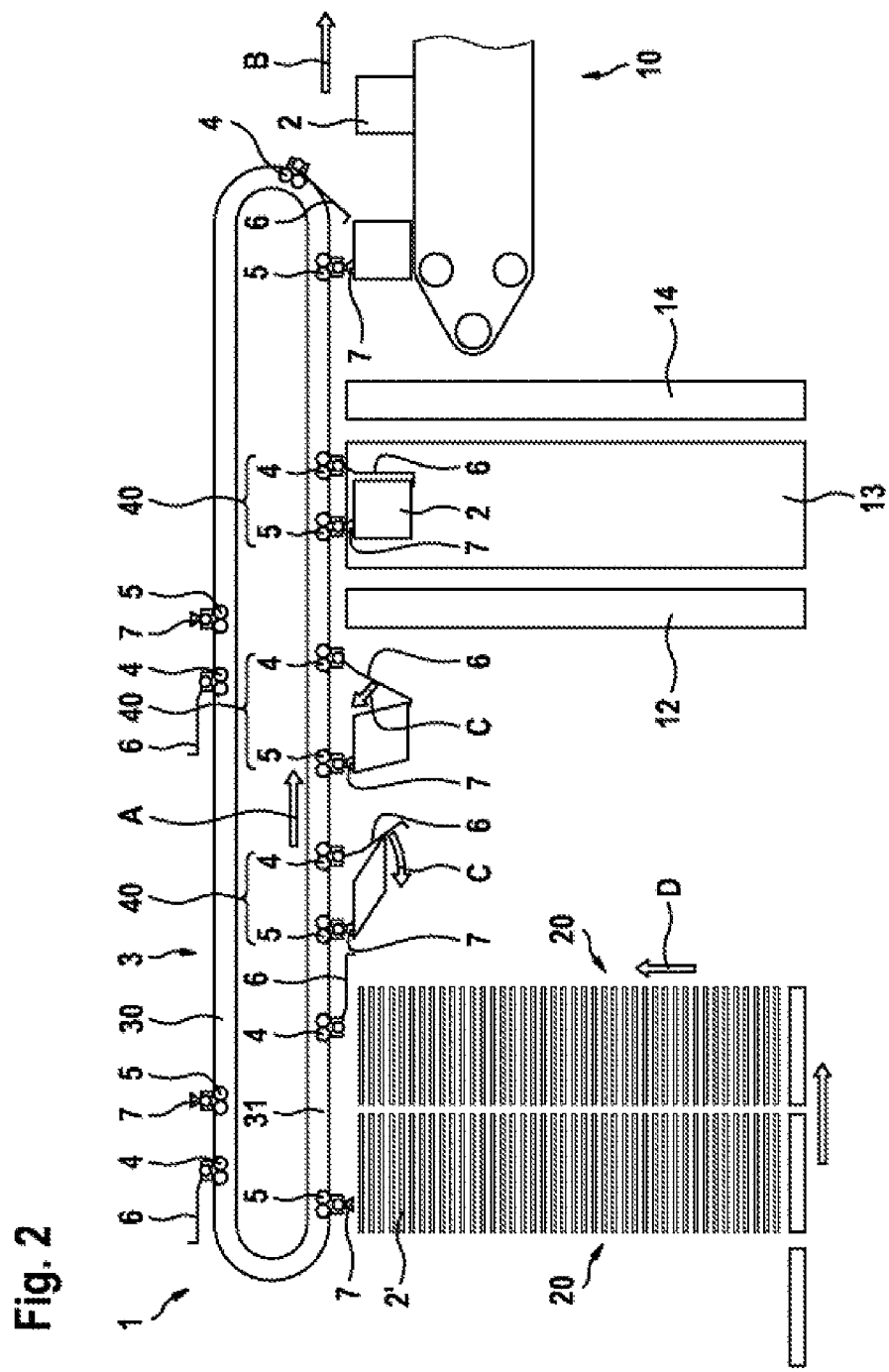
FIG. 2 shows a schematic side view of a packaging arrangement according to a second exemplary embodiment of the invention.

FIG. 2 shows a packaging arrangement 1 according to a second exemplary embodiment of the invention, identical or technically identical components being designated by the same reference signs as in the first exemplary embodiment.

As in the first exemplary embodiment, a first conveying element 4 and a second conveying element 5 of the second exemplary embodiment form a common conveying device 40. In the second exemplary embodiment, however, the circulating conveying route 30 also has arranged beneath it, in addition to means for removing and erecting the collapsed packaging means 2', an identifying module 12 and a closure module 14. The identifying module 12 provides printing on the packaging means 2 in order to identify the contents. Furthermore, a loading module 13 fills the opened packaging means 2 with articles. The loading module 13 here is arranged to the side of the vertically arranged conveying route 3, and it is therefore possible for the articles to be pushed laterally into the opened packaging means 2. In order for the pushing-in operation to take place correctly, a flap-opening device 8 in the form of a bent-over hook-shaped element is provided at the free end of the erecting device 6, said device 8 opening the flaps of the packaging means 2 and keeping them in the open position. The loading module 13 is followed downstream, as seen in a transporting direction (arrow A), by a closure module 14, which closes the loaded, still open packaging means 2. It is possible here for the closure module 14 to have, for example, active elements, e.g. grippers or the like, and/or passive elements (fixed guide rails or the like), in order to carry out the closure operation.

It is also the case in the second exemplary embodiment that the individual conveying elements 4, 5 can each be driven, once again, individually and independently of one another. It is thus possible for different speeds to be realized in particular for the different modules. For example it is possible, in the case of the identifying module, for the common conveying device 40, formed by the first and second conveying elements 4, 5, to be stopped completely. In contrast, in the case of the loading module 13, it is possible to maintain a predetermined speed for the common conveying device, formed by the first and second conveying elements 4, 5, wherein the loading module has a pushing-in element which is correspondingly moved along with it. It is also the case that the closure module 14 may have for example active closure elements, such as grippers or the like, moving along at predetermined speeds with the moving packaging means.

To summarize, it can therefore be said that, for the above-described exemplary embodiments of the packaging arrangement 1 according to the invention, suspended transportation of packaging means, in particular packaging cartons, is possible, wherein it is also possible, at the same time, for collapsed packaging means to be removed and erected.

The suspended arrangement of the packaging means, as a result of the vertically arranged conveying route 3, thus makes it possible to utilize the space beneath the transported packaging means for arranging a wide variety of different modules. Particularly preferably, the conveying elements are moved individually on the conveying route, and more preferably in each case a first conveying element 4 and a second conveying element 5 form a common conveying device 40, executing the conveying operation on the conveying route 3.

What is claimed is:

1. A packaging arrangement, comprising
an apparatus for transporting packages, including
a circulating conveying route (3) and
a multiplicity of conveying elements (4, 5),
wherein the circulating conveying route (3) is arranged to provide an upper-strand region (30) and a lower-strand region (31) of the conveying route;
wherein the conveying route is configured such that the packages are transported linearly along only the lower-strand region (31);
wherein the conveying elements (4, 5) are each configured to be driven individually and independently of one another;
wherein a first one of the conveying elements (4) and a second one of the conveying elements (5) together form a common conveying device (40) configured to convey an individual package;
wherein the first one of the conveying elements (4) has an erecting device (6) configured to erect the individual package when the individual package is in a collapsed state, the erecting device (6) including a pivotable lever; and
wherein the second one of the conveying elements (5) has a retaining device (7) configured to retain the individual package in a suspended state as the package travels linearly along the lower-strand region, the retaining device (7) including a gripper or suction element.

2. The packaging arrangement as claimed in claim 1, characterized in that at least one of the first conveying element (4) and the second conveying element (5) of the common conveying device (40) has a flap-opening device (8), which brings flaps on the package into an open position and/or holds the flaps in an open position.

3. The packaging arrangement as claimed in claim 1, further comprising a packaging-means module with a packaging-means store (20) having a multiplicity of collapsed packages, wherein the packaging-means store (20) is arranged beneath the circulating conveying route (3).

4. The packaging arrangement as claimed in claim 1, further comprising a loading module (13).

5. The packaging arrangement as claimed in claim 4, characterized in that the loading module (13) is arranged laterally on the conveyed package.

6. The packaging arrangement as claimed in claim 1, further comprising a closure module (14) for closing filled packages.

7. The packaging arrangement as claimed in claim 1, characterized in that the packages are cartons.

8. The packaging arrangement as claimed in claim 1, further comprising an identifying module (12) for providing packages with identification.

9. The packaging arrangement as claimed in claim 1, further comprising a closure module (14) for closing filled packages, a weighing module for weighing empty and/or loaded packages, and an identifying module (12) for providing packages with identification.

\* \* \* \* \*